(No Model.) 2 Sheets—Sheet 1.
B. W. SCOTT.
SPEED INDICATOR.
No. 583,338. Patented May 25, 1897.
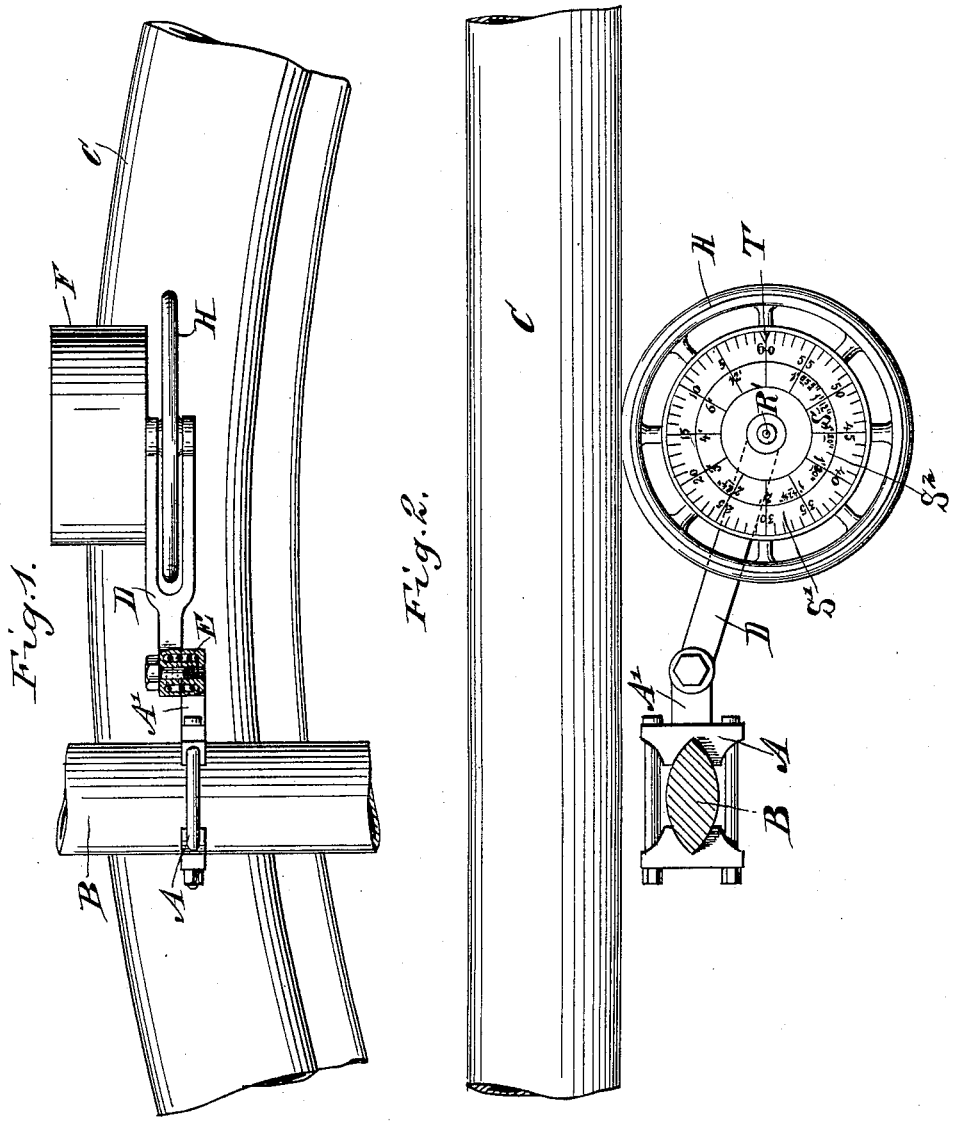
WITNESSES:
INVENTOR
B. W. Scott
BY
ATTORNEYS.

(No Model.) 2 Sheets—Sheet 2.

B. W. SCOTT.
SPEED INDICATOR.

No. 583,338. Patented May 25, 1897.

WITNESSES:

INVENTOR
B. W. Scott
BY
ATTORNEYS.

UNITED STATES PATENT OFFICE.

BARTON W. SCOTT, OF SAN JOSÉ, CALIFORNIA.

SPEED-INDICATOR.

SPECIFICATION forming part of Letters Patent No. 583,338, dated May 25, 1897.

Application filed June 23, 1896. Serial No. 596,580. (No model.)

*To all whom it may concern:*

Be it known that I, BARTON W. SCOTT, of San José, in the county of Santa Clara and State of California, have invented a new and Improved Speed-Indicator, of which the following is a full, clear, and exact description.

The object of the invention is to provide a new and improved speed-indicator more especially designed for use on bicycles and other vehicles and arranged to enable the rider to see at a glance at what rate of speed the vehicle is traveling.

The invention consists principally of weights mounted to swing and driven from a revoluble part of the vehicle and a mechanism set in motion by the centrifugal action of the said weights to indicate the speed of the vehicle.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 3:
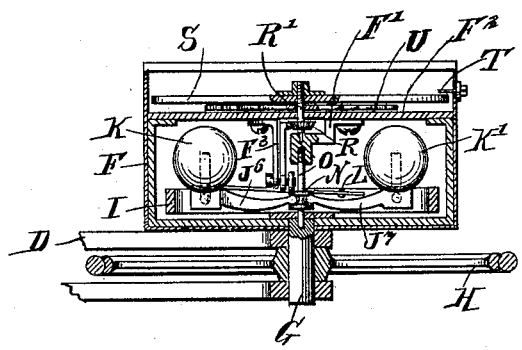
Figure 4:
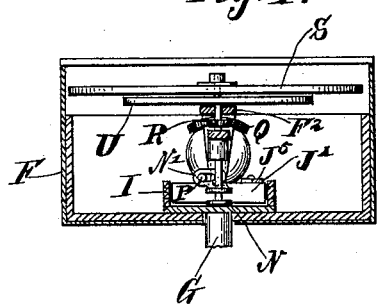
Figure 6:
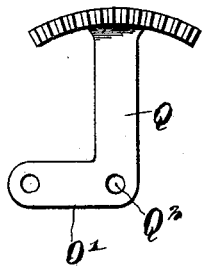
Figure 7:
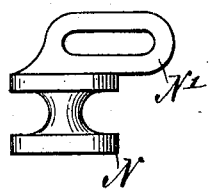
Figure 5:
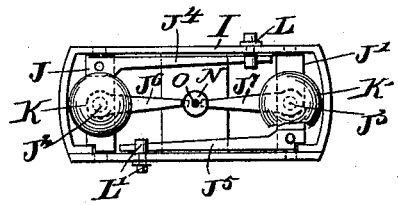

Figure 1 is a side elevation of the improvement as applied. Fig. 2 is a plan view of the same. Fig. 3 is a sectional side elevation of the improvement. Fig. 4 is a transverse section of the same. Fig. 5 is a plan view of the weights and their frame. Fig. 6 is an enlarged face view of the segmental gear-wheel. Fig. 7 is a similar view of the sliding sleeve.

The improved speed-indicator is supported by a suitable clamp A from one of the arms of the fork B, carrying the front or steering wheel C of the vehicle. On the clamp A is formed an arm A', on which is pivoted a forked arm D, pressed in one direction by a coiled spring E, held in the pivotal ends of the arms A' and D.

The arm D supports a fixed casing F, and in the said arm is journaled a vertically-disposed shaft G, carrying a wheel H in frictional contact with the rim of the wheel C, so that when the latter is rotated a rotary motion is transmitted by the said wheel H to the shaft G. The wheel H is preferably provided with a rim of rubber or other suitable soft material to insure a proper transmission of the motion of the wheel C to the said wheel H and shaft G.

On the upper end of the shaft G and within the stationary casing F is secured a frame I, made rectangular in shape, as plainly shown in Fig. 5, the said frame rotating with the shaft G. In the ends of the frame I are journaled the transversely-extending rock-shafts J and J', provided with vertically-disposed pins $J^2$ and $J^3$, respectively, on which are mounted the weights K and K', preferably in the form of balls, as indicated in the drawings. Now it will be seen that when the device is in use and the shaft G is rotated then the frame I in rotating with the said shaft carries the weights K and K' around, and the centrifugal action of the said weights tends to carry the shafts J and J' upwardly against the tension of springs $J^4$ and $J^5$, respectively, extending inwardly from the rock-shafts, the free ends of the springs being held in bolts L L', vertically adjustable in the sides of the frame I.

When the rotary motion of the frame I diminishes or ceases, then the springs $J^4$ and $J^5$ gradually return the rock-shafts to their normal position. From the rock-shafts J and J' extend inwardly the arms $J^6$ and $J^7$, engaging a grooved collar N, mounted to slide vertically on a shaft O, secured in a bracket F', attached to the under side of a bar $F^2$, forming part of the casing F.

On the top of the sleeve N is formed a slotted arm N', engaged by a pin P, projecting from an arm Q', extending from the fulcrumed end of a segmental gear-wheel Q, fulcrumed at $Q^2$ on a bracket $F^3$, secured to the bar $F^2$. The segmental gear-wheel Q is in mesh with a pinion R, fastened on a shaft R', mounted to turn in suitable bearings in the bracket F' and the bar $F^2$, as plainly shown in Figs. 3 and 4.

The upper end of the shaft R' carries a dial S, having two graduations S' and $S^2$, of which the outer graduation S' indicates the speed in minutes and seconds per mile, while the inner graduation $S^2$ indicates the number of miles per hour traveled by the wheel.

A pointer T, secured to the casing F, indicates on the said graduations to enable the rider to see at a glance at what rate of speed he is traveling. A hair-spring U is connected with the shaft R' to insure a proper return movement of the dial S.

The operation is as follows: When the vehicle is in motion, then the rotary motion of the wheel C is transmitted by the wheel H to the shaft G, so that the frame I is caused to rotate and the balls K and K', owing to centrifugal force, swing outwardly, thereby rocking the shafts J and J' against the tension of the springs $J^4$ and $J^5$, as previously explained. The rocking motion of the shafts J and J' is transmitted by the arms $J^6$ and $J^7$ to the sleeve N, so that the latter slides up or down on the pin P, and consequently a swinging motion is given to the segmental gear-wheel Q by the pin P engaging the slotted arm N' of the said sleeve N. The segmental gear-wheel Q imparts a rotary motion to the pinion R, so that the dial S is turned and the stationary pointer T indicates the speed in minutes and seconds per mile on the outer graduation S' and the number of miles per hour traveled by the vehicle on the graduation $S^2$. It is further understood that the balls K and K' move upward or spread as the rotary motion of the frame increases, and when this motion diminishes the springs $J^4$ and $J^5$ bring the rock-shafts, and consequently the balls, back to their normal vertical position over the shafts J and J'.

Having thus described my invention, I claim as new and desire to secure by Letters Patent—

1. The combination with a casing, of a frame revolubly mounted within the casing, a rock-shaft mounted in each end of the frame, a spring-arm fixed to each rock-shaft, the spring-arms being connected to the frame whereby the rock-shafts are held in normal position, a weight fixed to each rock-shaft, a rigid arm connected to each rock-shaft, a spindle rigid within the casing, a flanged collar sliding on the spindle and having a longitudinally-slotted laterally-extended arm, a sector mounted in the casing and having a pin fitting in the slot of the said lateral arm, a second spindle mounted in the casing, a gear on the second spindle, the gear meshing with the sector, and a dial carried by the said second spindle, substantially as described.

2. The combination of an elongated frame pivoted at an intermediate point and turning in the plane of its side edges, an eccentric rock-shaft journaled in the frame and out of radial coincidence with the same, a spring actuating the rock-shaft, an arm fixed to the rock-shaft and extending radially to the axis of the frame, a collar sliding in a direction coincident to the axis of the frame and engaged by the rod, and an indicator driven from the collar, substantially as described.

BARTON W. SCOTT.

Witnesses:
N. E. WRETMAN,
EDWARD B. EWING.